United States Patent
Henderson Sapir et al.

(10) Patent No.: US 9,559,485 B2
(45) Date of Patent: Jan. 31, 2017

(54) DUAL WAVELENGTH PUMPED LASER SYSTEM AND METHOD

(71) Applicant: Adelaide Research & Innovation Pty Ltd, Adelaide, South Australia (AU)

(72) Inventors: Ori Henderson Sapir, Adelaide (AU); Jesper Munch, Adelaide (AU); David Ottaway, Adelaide (AU)

(73) Assignee: Adelaide Research & Innovation Pty Ltd. (AU)

( * ) Notice: Subject to any disclaimer, the term of this patent is extended or adjusted under 35 U.S.C. 154(b) by 0 days.

(21) Appl. No.: 14/888,228

(22) PCT Filed: May 2, 2014

(86) PCT No.: PCT/AU2014/000486
§ 371 (c)(1),
(2) Date: Oct. 30, 2015

(87) PCT Pub. No.: WO2014/176639
PCT Pub. Date: Nov. 6, 2014

(65) Prior Publication Data
US 2016/0072249 A1    Mar. 10, 2016

(30) Foreign Application Priority Data

May 3, 2013    (AU) ................................ 2013901569
Dec. 12, 2013    (AU) ................................ 2013904852

(51) Int. Cl.
*H01S 3/091*    (2006.01)
*H01S 3/067*    (2006.01)
(Continued)

(52) U.S. Cl.
CPC .............. *H01S 3/091* (2013.01); *H01S 3/067* (2013.01); *H01S 3/094092* (2013.01);
(Continued)

(58) Field of Classification Search
CPC .... H01S 3/091; H01S 3/067; H01S 3/094092; H01S 3/094042; H01S 3/1608; H01S 3/094096
See application file for complete search history.

(56) References Cited

U.S. PATENT DOCUMENTS 5,383,197 A * 1/1995 Millar ..................... H01S 3/067
                                                  372/6
7,113,328 B2   9/2006 Gomes et al.
(Continued)

FOREIGN PATENT DOCUMENTS

EP    1220384    7/2002

OTHER PUBLICATIONS

International Search Report corresponding to Int'l Patent Appl. PCT/AU2014/000486, Jun. 5, 2014, 3 pages.

*Primary Examiner* — Dung Nguyen
(74) *Attorney, Agent, or Firm* — Tarolli, Sundheim, Covell & Tummino LLP

(57) ABSTRACT

A dual wavelength pumping system and method have been developed to improve the efficiency of laser systems operating in the raid infrared region has been developed, in a conventional system the ions are excited from a ground state to an upper lasing state using a light pump. They then undergo a laser transition to leave the ion in a long lived post lasing excited state from which it eventually decays back to the ground state. In contrast they present system uses a first light pump to pump ions from the ground state to the post lasing state, and a second light pump to pump ions from the post lasing state to the upper lasing state. This system thus exploits the long lifetime of the post lasing state to enable it to become a virtual ground state for the second laser allowing continued cycling of ions between the upper lasing state and the post lasing state. A system using an Erbium, doped fiber generated a 3.5 μm laser output with an average (Continued)

power of over 250 mW and an initial slope, efficiency of 25.4% (previous system have only generates less than 10 mW of power with efficiencies of 3%).

21 Claims, 5 Drawing Sheets

(51) Int. Cl.
 *H01S 3/094* (2006.01)
 *H01S 3/16* (2006.01)
 *H01S 3/17* (2006.01)
(52) U.S. Cl.
 CPC ... *H01S 3/094042* (2013.01); *H01S 3/094096* (2013.01); *H01S 3/161* (2013.01); *H01S 3/1608* (2013.01); *H01S 3/1616* (2013.01); *H01S 3/173* (2013.01)

(56) References Cited

U.S. PATENT DOCUMENTS

| | | | |
|---|---|---|---|
| 7,633,990 B2 | 12/2009 | Shori | |
| 7,679,027 B2 * | 3/2010 | Bogatu | H05G 2/003 219/121.36 |
| 2005/0100073 A1 * | 5/2005 | Hughes | H01S 3/06708 372/70 |

* cited by examiner

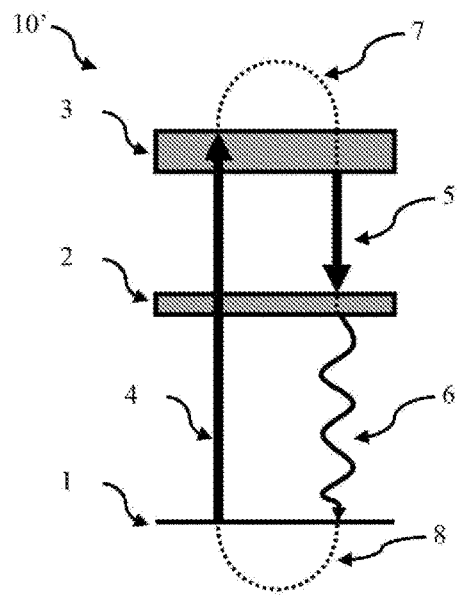
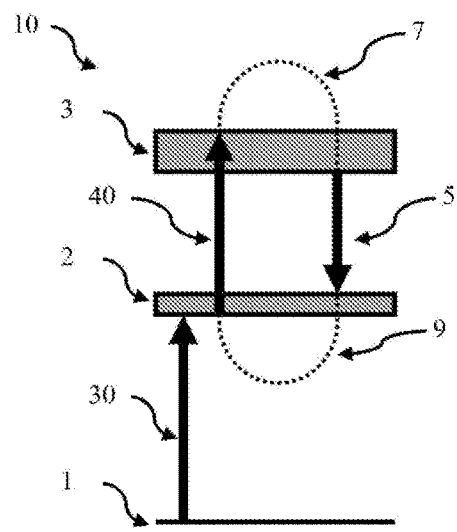
Figure 1A
Figure 1B
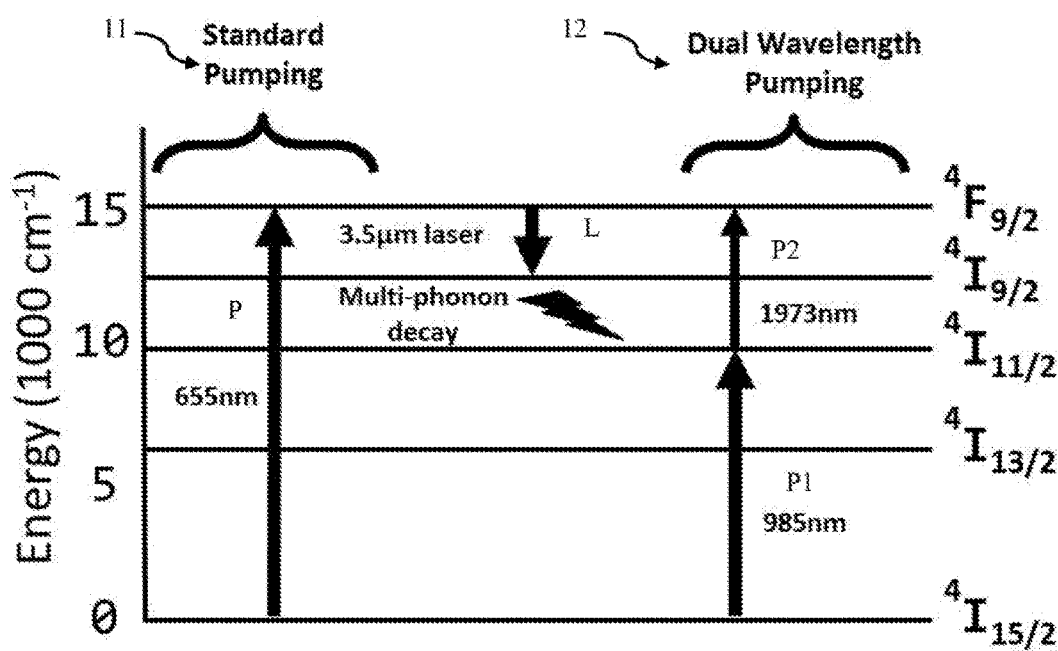
Figure 2A
Figure 2B

DUAL WAVELENGTH PUMPED LASER SYSTEM AND METHOD

CROSS-REFERENCE TO RELATED APPLICATIONS

This application is the U.S. national phase entry of PCT/AU2014/000486, filed on 2 May 2014, which, claims priority from Australian Provisional Patent Application No. 2013901569 filed on 3 May 2013; and Australian Provisional Patent Application No. 2013904852 filed on 12 Dec. 2013. The content of each of these applications is hereby incorporated by reference in their entirety.

TECHNICAL FIELD

The present invention relates to lasers. In a particular form, the present invention relates to a pumping system for generating lasing emission from a gain medium.

BACKGROUND

The mid-infrared (2-16 μm) part of the electromagnetic spectrum offers significant opportunities for exciting scientific breakthroughs and technological advances because it is a key enabler of new advanced sensing technologies. However, the lack of bright sources of mid-infrared radiation has limited the exploitation of this part of the electromagnetic spectrum. The unfavourable laser dynamics of rare earth doped laser sources that operate in this part of the spectrum often make them inefficient, resulting in low output powers for practical use.

Virtually all mid-infrared laser transitions occur between energy levels that are located well above the ground state. FIG. 1A shows a schematic energy level diagram 10' of a prior art single wavelength pumping system for generating mid-infrared laser radiation. In standard operation the ions are excited from the ground state 1 to the upper laser level 3 using a near infrared, or visible light pump source 4. An ion in the excited upper laser level 3 then undergoes a laser transition 5 emitting a laser photon and leaving the ion in a long lived post lasing excited state 2. After some delay the ion decays back to the ground state 6 releasing waste energy in the process. Once an ion returns to the ground state it can again be re-excited 8 back to the upper lasing state 3 by pump 4. The cyclic nature of this process is illustrated by dotted line 7 which links the excitation phase to the lasing transition and decay to ground state phase, and dotted line 8, which links this phase back to the excitation phase.

Whilst this single wavelength pumping approach can be used to directly excite the laser ions from the ground state 1, the long lifetime of ions in the long lived post lasing excited state 2 causes serious bottlenecks of ions building up in this state. For example, in rare earth doped fibre lasers, this long lived post lasing excited state 2 can have lifetimes of hundreds of microseconds or several milliseconds (or more). This build up or bottle neck of ions in the long lived post lasing excited state 2 results in termination of the lasing process due to failure to maintain the required population inversion between the upper state 3 and long lived post lasing excited state 2, and thus limits the available lasing power of such systems. The long lived post lasing state can seriously limit laser performance even if it is not the lower lasing state because ions that collect here are not returned promptly to the ground state to absorb the pump light leading to reduced excitation rate to the upper lasing state and poorer efficiency. Further, the direct excitation approach results in poor optical efficiency and significant waste heat energy as the ions return 6 to the ground state 1 from the long lived post lasing excited state 2.

FIG. 2A is a schematic energy level diagram 11 of an erbium doped ZBLAN fibre illustrating a pumping arrangement (P) using a 655 nm DCM dye laser to excite ions from the $^4I_{15/2}$ ground state to the $^4F_{9/2}$ state, or energy level (the terms state and energy level will be used interchangeably). A lasing transition (L) from the $^4F_{9/2}$ level to the $^4I_{9/2}$ level generates a 3.5 μm laser output. This system resulted in an 8 mW output with a slope efficiency of less than 3% at room temperature. Once the lasing transition has occurred the ions rapidly decay from the $^4I_{9/2}$ levels and bottleneck in the $^4I_{11/2}$ and $^4I_{13/2}$ levels that have long lifetimes of ~6.5 ms and ~8.5 ms respectively. This prevents the ground state from being replenished which reduces pump radiation absorption and the repopulation of the upper lasing level, $^4F_{9/2}$ resulting in very poor laser slope efficiency.

Several approaches have been attempted to address the significant problem of ions building up in long lived post lasing excited states of the medium, and thus improve the efficiency of laser systems operating in the mid infrared region. These have sought to deplete the population of ions in the long lived excited state by a promoting or inducing a beneficial up-conversion process in which an ion in the long lived state is promoted to a higher state such as by stimulation with a further pump or by co-doping the medium with other rare earth ions. Up-conversion has been shown to work for specific laser transitions with particular dopants but adversely affects the efficiency of other transitions because of reductions in the lifetime of upper lasing state. Co-dopants can also be used to reduce the bottlenecks in the system but do not in general improve the Stokes efficiency of the laser.

There is thus a need to develop pumping systems and methods to improve the efficiency of laser systems operating in the mid infrared region, or at least to provide users with a useful alternative to existing laser systems.

SUMMARY

According to one aspect of the present invention, there is provided a method for pumping a gain medium to generate a lasing transition of a lasing wavelength between an upper lasing state and a lower lasing state in the gain medium, the method comprising:

directing electromagnetic (EM) radiation of a first wavelength from a first pump source into the gain medium to excite ions in the gain medium from a ground state to a long lived excited state;

directing EM radiation of a second wavelength from a second pump source into the gain medium to excite ions in the gain medium from the long lived excited state to an upper state to create a population inversion between the upper lasing state and the lower lasing state to generate the lasing transition, wherein post lasing the majority of ions in the upper state decay back to the long lived excited state, and the lasing wavelength is longer than the second wavelength.

In one form, ions are cycled between the long lived excited state and the upper state. In one form, an ion in the upper lasing state decays back to the long lived excited state through a non-radiative process and at least one lasing transition. In one form, the lifetime of the long lived excited state is longer than the average time taken for an ion to be pumped by the second pump source to the upper state and to return to the long lived excited state via the lasing transition.

In one form, the lifetime of the long lived excited state is at least 100 μs. In one form long lived excited state is at least 500 μs. In one form, the long lived excited state is at least 1 ms.

In one form, the EM radiation from the first pump source is used to establish and maintain a population of ions in the long lived excited state. The long lived excited state may be considered, and subsequently referred to, as a virtual ground state, as the action of the second pump source is to repeatedly cycle an ion between the upper state and the virtual ground state, before the ion decays back to the actual ground state. That is, once an ion re-enters the long lived excited state after a lasing transition, the ion is more likely to be excited (or stimulated) to the upper state due to the presence of radiation from the second pump source, than it is to decay back to the ground state.

In one form, the power of the second pump source exceeds the power of the first pump source.

In one form, EM radiation from the first pump source and EM radiation from the second pump source are simultaneously directed into the gain medium. In a further form, the gain medium is one of an optical fibre, a waveguide, a medium containing a dye, or a bulk host. In one form, the gain medium is as rare earth doped low phonon energy glass fibre.

In one form, the long lived excited state is lower than the lower lasing state of the gain medium. In one form, the long lived excited state and the lower lasing state are the same energy state of the gain medium. In an alternate form, the virtual ground state and the lower lasing level are different sub-levels of the same energy state of the gain medium.

In one form, the upper state and the upper lasing state are the same energy state of the gain medium. In an alternate form, the upper state is higher than the upper lasing state of the gain medium.

In one form, the lasing transition is between 1-16 μm. In a further form, the lasing transition is between 2-5 μm. In a further form, the average output power is at least 10 mW.

According to another aspect of the present invention, there is provided a dual wavelength pumped laser system comprising:

a gain medium comprising a ground state, a long lived excited state, an upper state, an upper lasing state and a lower lasing state;

a first pump source configured to generate electromagnetic (EM) radiation of a first wavelength and to direct the EM radiation into the gain medium, wherein the first pump source is used to excite ions in the gain medium from a ground state to a long lived excited state; and a second pump source configured to generate EM radiation of a second wavelength and to direct the EM radiation into the gain medium, wherein the second pump source is used to excite ions in the gain medium from the long lived excited state to an upper state to create a population inversion between the upper lasing state and the lower lasing state to generate a lasing transition, wherein post lasing, the majority of ions in the upper state decay back to the long lived excited state, and a lasing wavelength of the lasing transition is longer than the second wavelength.

In one form, ions are cycled between the long lived excited state and the upper state. In one form an ion in the upper state decays back to the long lived excited state through a non-radiative process and a least one lasing transition. In one form, the lifetime of the long lived excited state is longer than the average time taken for an ion to be pumped by the second pump source to the upper state and to return to the long lived excited state via the lasing transition.

In one form the lifetime of the long lived excited state is at least 100 μs. In one form the lifetime of the long lived excited state is at least 500 μs. In one form, the lifetime of the long lived excited state is at least 1 ms.

In one form, the EM radiation from the first pump source is used to establish and maintain a population of ions in the long lived excited state. In one form, the power of the second pump source exceeds the power of the first pump source.

In one form, EM radiation from the first pump source and radiation from the second pump source are simultaneously directed into the gain medium. In a further form, the gain medium is an optical fibre, a waveguide, a medium containing a dye, or a bulk host. In one form the gain medium is a rare earth doped low phonon energy glass fibre.

In one form, the long lived excited state is lower than the lower lasing state of the gain medium. In one form the long lived excited state and the lower lasing state are the same energy state of the gain medium. In an alternate form, the virtual ground state and the lower lasing level are different sub-levels of the same energy state of the gain medium. In one form, the upper state and the upper lasing state are the same energy state of the gain medium. In an alternate form, the upper state is higher than the upper lasing state of the gain medium.

In one form, the first EM radiation pumping system comprises a first laser. In one form, the second EM radiation pumping system comprises a second laser.

In one form, the lasing transition is between 1-16 μm. In a further form, the lasing transition is between 2-5 μm. In a further form the average output power is at least 10 mW.

BRIEF DESCRIPTION OF DRAWINGS

Embodiments of the present invention will be discussed with reference to the accompanying drawings wherein:

FIG. 1A is a schematic energy level diagram of a prior art single wavelength pumped laser system;

FIG. 1B is a schematic energy level diagram of a dual wavelength pumped laser system according to an embodiment of the present invention;

FIG. 2A is a schematic energy level diagram of an erbium doped ZBLAN fibre illustrating standard pumping to generate a 3.5 μm lasing transition;

FIG. 2B is a schematic energy level diagram of an erbium doped ZBLAN fibre illustrating dual wavelength pumping to generate a 3.5 μm lasing transition according to an embodiment of the present invention;

In the following description, like reference characters designate like or corresponding parts or features throughout the figures.

DESCRIPTION OF EMBODIMENTS

Figure 3:
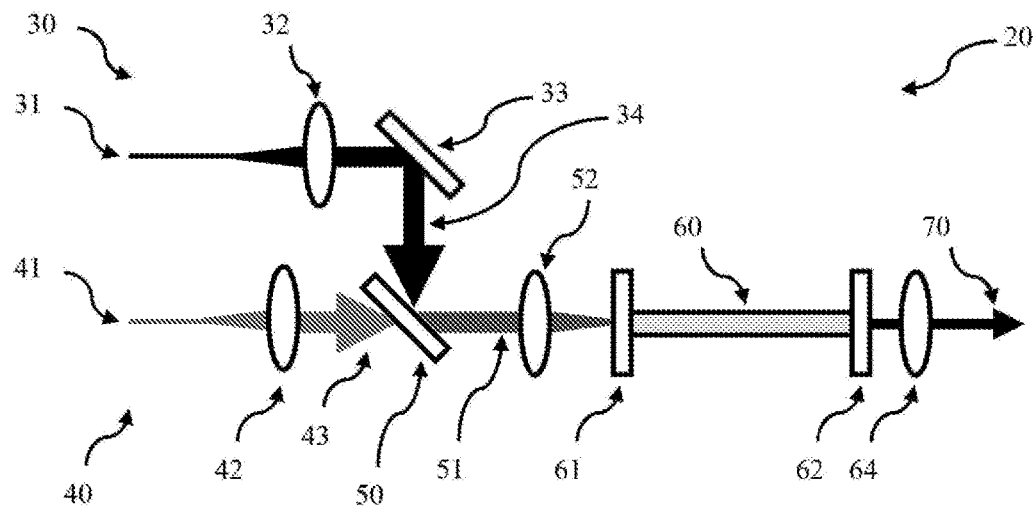
FIG. 3 is a schematic diagram of a dual wavelength pumped laser system according to an embodiment of the invention.

A dual wavelength pumping system and method to improve the efficiency of laser systems operating in the mid infrared region has been developed which exploits the previous weakness of the gain medium having long lived post lasing excited states, to turn it into a major strength.

FIG. 1B is a schematic energy level diagram 10 of a dual wavelength pumped laser system according to an embodiment of the present invention. In contrast to the prior art pumping system which directly excites ions from the ground state 1 to an upper lasing state 3, the dual wavelength pumping system first pumps ions into the long lived excited state 2 using electromagnetic (EM) radiation of a first wavelength from a first pumping source 30 (or first pumping system, also designated as P1 in some of the figures). Ions in the long lived excited state 2 are then excited (promoted) to the upper state 3 by EM radiation of a second wavelength from a second pumping source 40 (or second pumping system, also designated as P2 in some of the figures). Radiation from the second pump source may be directed into the gain medium at the same location and at the same time with radiation from the first pump source (ie simultaneously), or radiation from the two sources may be directed into the gain medium from different locations (eg different ends of a fibre) and/or at different times (eg alternate pulsing if pulsed rather than continuous pumping sources are used). In this embodiment the upper state 3 is the upper lasing state of a laser transition 5 (also designated L in some of the figures), and the long lived excited state is the lower lasing state of the lasing transition.

An ion in the excited upper state 3 then undergoes a laser transition 5 emitting a laser photon and the ion returns to the long lived excited state 2. The lasing wavelength of the lasing transition is longer than the second wavelength. This can be seen in FIG. 1B as the length of the arrow of the second pump source is longer than the length of the arrow indicating that the energy gap is larger for the pump P2 compared to the laser transition L. That is the pump photon has a higher energy than the lasing photon. In some embodiments the upper state is the upper lasing state and in other embodiments the upper lasing state is an energy level lower than the upper state that an ion can descend such as via a non-radiative decay process. Similarly in some embodiments the lower lasing state is the long lived excited state and in other embodiments the lower lasing state is an energy level higher than the long lived excited state, in which case the ion can return to the long lived excited state after a lasing transition via a non-radiative decay process. As shown in FIG. 1B an energy state may be a band due to splitting effects (eg Stark splitting) or other effects. A band may comprise a continuous band, discrete sub levels, discrete continuous sub bands, or some other combination. Examples of non-radiative processes include phonon decay and energy transfer processes (including multi phonon decay, cross relaxation, up conversion etc). Post lasing the majority of ions in the upper state decay back to the long lived excited state. Once an ion returns to the long lived excited state it is available to be re-excited back (ie recycled) to the upper lasing state 2 by second pump source 40, without having to wait for the ion to decay back to the ground state. That is, rather than the long lived state acting as a bottle neck in the process for returning ions to the upper state, the long lived state acts as the source of ions for the upper state. The cyclic nature of this process is illustrated by dotted line 7 which links the excitation phase to the lasing transition and decay to long lived excited state phase, and dotted line 9 which links this phase backs to the second excitation phase.

In this pumping method, the second pumping system 40 is used to cycle ions between the virtual ground state and the upper state (and thus the upper lasing state), rather than having to wait for ions to drop to the ground state before they can be re-excited back up to the upper state (and thus the upper lasing state). The long lived excited state may thus be considered, and will subsequently be referred to, as a virtual ground state, as the action of the second pump source is to repeatedly cycle an ion between the upper state and this virtual ground state before the ion decays back to the actual ground state. That is, once an ion re-enters the long lived excited state after a lasing transition, the ion is more likely to be excited (or stimulated) to the upper state due to the presence of radiation from the second pump source, than it is to decay back to the ground state. The long lifetime of the virtual ground state provides sufficient time for the second pumping system to re-excite ions back up to the upper lasing state. In practical systems there is always likely to be some leakage of ions from the virtual ground state back down to the actual ground state (possibly via other states) and the role of the first pump source is thus to establish and maintain a population of ions in the long lived excited state for excitation by the second pump source. This lowers the power requirements of the first pump source.

In this context long lived is relative to the average time taken for an ion to be pumped by the second pump source and then undergo stimulated emission and return to the virtual ground state. This will of course depend upon the lifetime of an ion in the upper lasing state under stimulated emission conditions. In some embodiments, the long lived excited state (the virtual ground state) has a lifetime of at least one order of magnitude longer than the upper lasing state. In rare earth doped media the lifetime of the virtual ground state is typically longer than a few hundred microseconds (eg 100 µs, 200 µs, 300 µs, 500 µs, 750 µs) and may be of the order of milliseconds or more (eg 1 ms, 2 ms, 5 ms, 10 ms, etc).

This method for pumping a gain medium to generate a lasing transition having a lasing wavelength between an upper lasing state and a lower lasing state in the gain medium is further illustrated in Figure to which is a flow-chart 100 of an embodiment of the invention. The first step 110 comprises directing EM radiation of a first wavelength from a first pump source into a gain medium to excite ions in the gain medium from a ground state to a long lived excited state (the virtual ground state). The second step 120 then comprises directing EM radiation of a second wavelength from a second EM radiation pump source into the gain medium to excite ions in the gain medium from the long lived excited state (the virtual ground state) to an upper state. The second EM radiation pump thus creates or maintains a population inversion between the upper lasing state and the lower lasing state to generate the lasing transition. Post lasing, the majority of ions in the upper state then decay hack to the virtual ground state. The radiation from the second pump source is then used to recycle 130 ions back up to the upper state before they drop back down to the virtual ground state after a lasing transition. The lasing wavelength is longer than the second wavelength.

Figure 4:
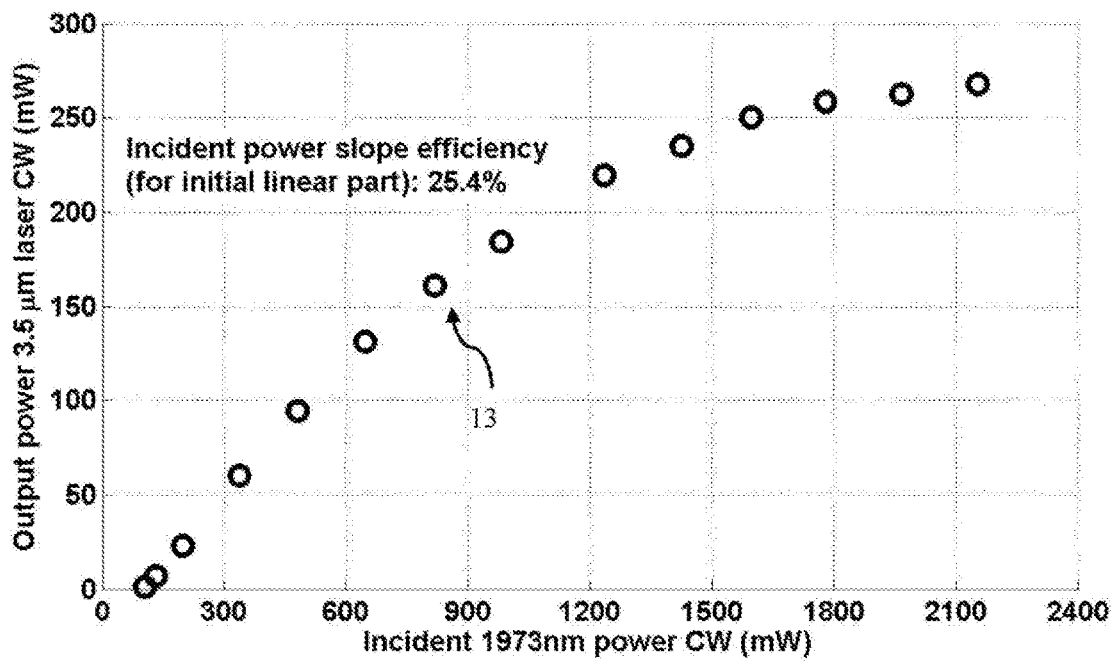
FIG. 4 is a graph showing the 3.5 μm laser output as a function of incident 1973 nm power of the dual pumped laser system illustrated in FIG. 3.

This methodology is further illustrated in FIG. 2B which is a schematic energy level diagram of an erbium ion doped into a zirconium fluoride based glass (ZBLAN) fibre. FIG. 2B illustrates the dual wavelength pumping method 12 to generate a 3.5 µm lasing transition according to an embodiment of the present invention. The first pump source generates EM radiation with a wavelength of 985 nm and excites the erbium ions from the $^4I_{15/2}$ ground state to the $^4I_{11/12}$ level. Since this level is long lived a significant population build-up occurs. A second pump source P2 generates EM radiation with a wavelength of 1973 nm that promotes the ions from the $^4I_{11/2}$ state to the $^4F_{9/2}$ state. The ions emit laser radiation at 3.5 µm and quickly relax back to the $^4I_{11/2}$ level via multi-phonon relaxation due to the small energy gap between $^4I_{9/2}$ and $^4I_{11/2}$. Therefore, in this laser the ions cycle between the $^4I_{11/2}$ and $^4I_{9/2}$ levels many times, and in this manner the dual wavelength pumping methodology creates a "virtual ground" at an elevated energy level with respect to the actual ground state. For this reason the long lived excited state 2 will also be referred to as the long lived virtual ground state. As illustrated in FIG. 4, this dramatically improves the slope efficiency of the laser given that Stokes efficiency of the dual wavelength, pumping laser is set by the ratio of the second pump wavelength ($P_2$) to that of the laser output (L) which is 55% compared with 18% when pumping is achieved by promoting ions from the ground state.

The FM radiation from the first pump source is used to establish and maintain a population of ions in the long lived virtual ground state. For example, in FIG. 2B once the system is in use the first 985 nm pump is used to replenish the small fraction of the ions that spontaneously leave the $^4I_{11/2}$ and fall back to the ground state. However, as this fraction is small, the first 985 nm pump can be much lower power than the second (ie the main) pump which pumps ions between the virtual ground state $^4I_{11/2}$ and the upper lasing state $^4I_{9/2}$. That is, in many embodiments the power of the second EM radiation pump 40 will substantially exceed the power of the first EM radiation pump 30. Further this arrangement has increased efficiency compared to single pumping system as there is less waste energy. Instead the second pump needs only to cycle ions from an already excited state. The first pump is only used to compensate for small loss of ions in the virtual ground state due to decay processes. These decays sometimes create heat and waste energy, and by substantially eliminating these decays, less heat is wasted and overall efficiency of the system is improved.

FIG. 3 shows a schematic diagram of a 3.5 µm fibre laser system comprising a first pump source 31 and a second pump source 41 that was constructed according to an embodiment of the invention. In this embodiment the gain medium 60 is an erbium doped ZBLAN glass fibre. The first pump 31 is a commercially available 985 nm wavelength 330 mW fibre coupled laser diode (Thorlabs PL980P330J). The second pump source 41, is an in-house built 1973 nm fibre laser that utilizes commercially available thulium doped fibre supplied by Nufern (Nufern PM TDF DC 10_130) and is pumped with a 790 nm fibre coupled diode (LIMO 35-F100-DL790).

The output beam 31 from the first pump system was collimated 32 and reflected via mirror 33 onto a dichroic 50, which overlaps beams 34 and 43 from the first and second pumping systems with the combined beam 51 mode matched into the core of the fibre 60 using an aspheric lens 52. The pump sources were launched through a mirror 61 which has a high reflectivity for 3.5 µm, whose high reflective surface was butted up against the fibre medium 60. The mirror 61 includes an antireflective coating for 985 nm and 1973 nm wavelengths.

The fibre had a numerical aperture of 0.15 and a core diameter of the 10 µm making it single mode for 3.5 µm and multi-mode for the two pump wavelengths. The length of the fibre was 18 cm and it was mounted in a straight line v-groove on a translation stage. The output coupler 62 was a partially reflective mirror that had a reflectivity of 90% at 3.5 µm and was butt coupled to the fibre.

For diagnostic purposes the output of the laser was collimated using a 1" focal length off-axis parabolic mirror (Thorlabs MPD127127-90-P01) and then imaged onto a power meter (Thorlabs S302C), a thermal camera (Ophir Pyrocam) or a grating spectrometer (Princeton Instruments, Acton SP2500i) depending on the measurement taken.

The output power emitted at 3.5 µm by the laser is shown as a function of the incident 1973 nm pump power (second pump) is illustrated as curve 13 in FIG. 4. The first pump (985 nm) incident power was 194 mW. It was estimated that ~90% of the incident 985 nm pump was launched into the fibre. These imperfect launching conditions and significant ground state depletion result in only 140 MW of 985 nm pump being absorbed. This result shows that high power of the first 985 nm pump is not required in order to achieve significant output at 3.5 µm. The non-linear behaviour displayed by the incident power curve 13 in FIG. 4 is the result of accumulation of ions in the bottom lasing state.

Figure 5A:
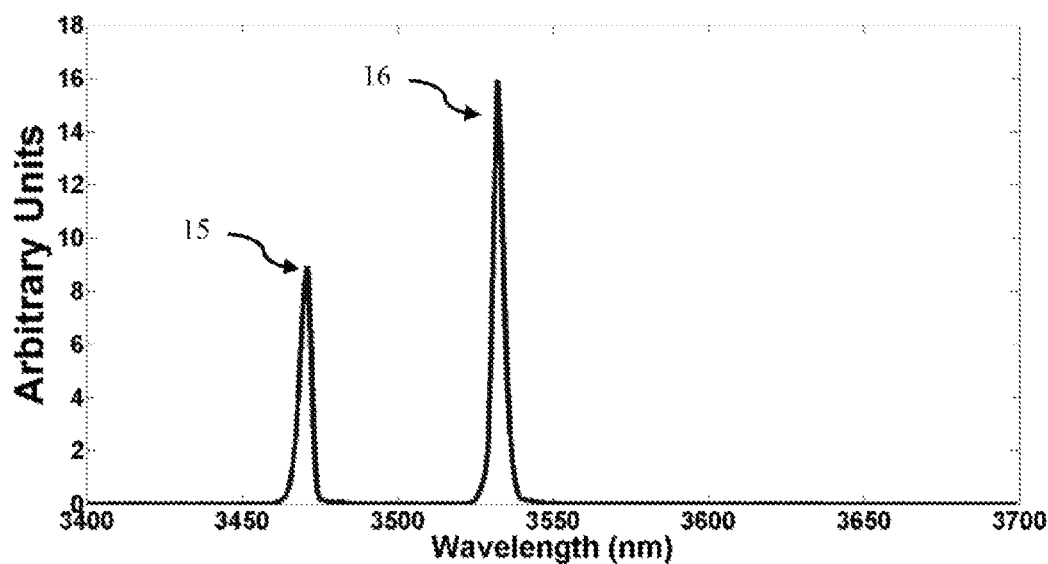
FIG. 5A is a plot of the laser emission spectra of the dual wavelength pumped laser system illustrated in FIG. 3.
Figure 5B:
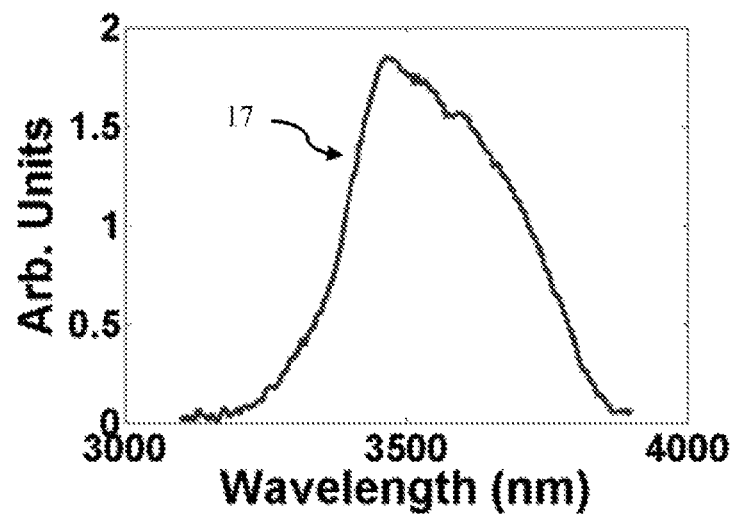
FIG. 5B is a plot of the fluorescence spectra of the Erbium $^4F_{9/2}$ to $^4I_{9/2}$ transition illustrated in FIG. 2A and FIG. 2B.
Figure 6:
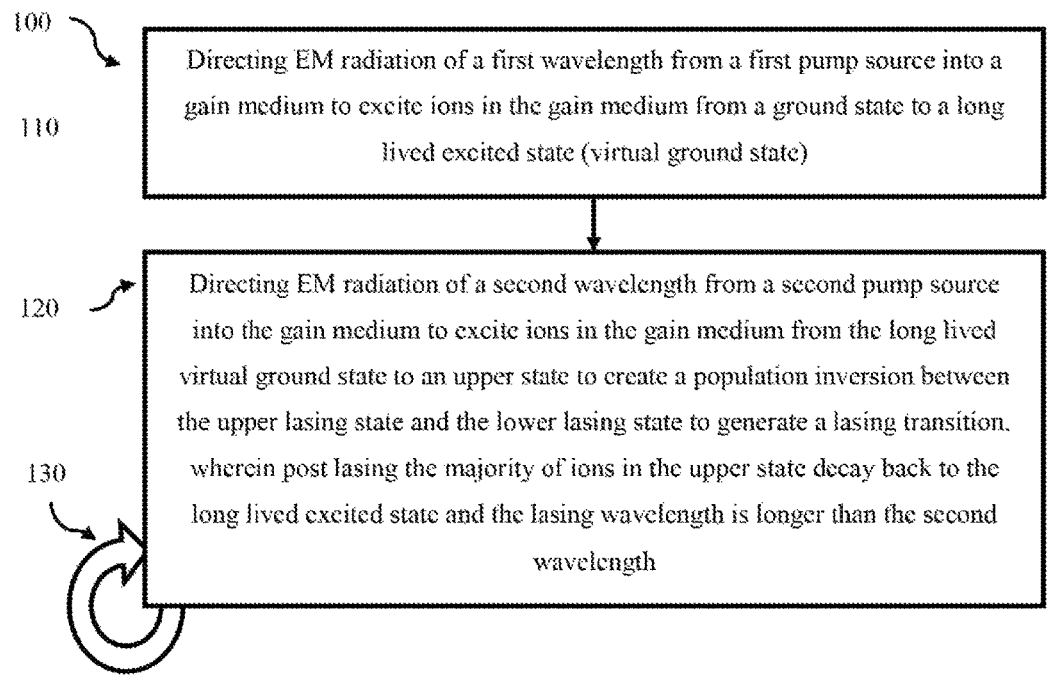
FIG. 6 is a flowchart of a method for generating a lasing transition in a gain medium according to an embodiment of the invention.

FIG. 5A shows a typical spectrum of the laser and FIG. 5B shows the broadband fluorescence of the $^4F_{9/2} \to {}^4I_{9/2}$ transition. The two laser lines at 3.47 and 3.54 µm can be observed to compete as a function of both pump powers, with a tendency for the 3.54 µm line to be in favour at higher total output powers. The very broadband fluorescence curve suggests that the output wavelength can be tuned over a very wide wavelength range (eg 3.2-3.9 µm) enabling access to an important part of the mid-infrared spectrum were many organic molecules have typical absorption lines, opening many exciting applications in environmental and medical monitoring.

The above example of a dual wavelength pumping system implementing the dual wavelength pumping method produced a 15 µm laser output with an average power of over 250 mW with an initial slope efficiency of 25.4%. This is a substantial improvement over previous systems which have only been able to generate less than 10 mW of power and an efficiency of 3%. To achieve this high efficiency it was necessary to dope the fibre with relatively low doping (1 mole % of $Er^{+3}$ ions). This was because higher doping levels led to significant losses due to the depopulation of both the $^4F_{9/2}$ (Top lasing state) and $^4I_{11/2}$ (Bottom pump state) due to energy exchange processes. However, it is to be understood that this represents one embodiment, and the dual wavelength pumping method described can be used in wide variety of lasing systems. For example this method could be used for 2.4 µm and 3.9 µm transitions in thulium and holmium respectively. Further whilst this system had highest efficiency at a relatively low doping concentration, this was due to the specific energy levels and energy exchange processes of this specific gain medium (ie choice of glass and dopant). In other systems with a different glass or dopant, it may be possible to obtain higher efficiencies using higher or lower doping concentrations. Whilst the method is particularly suitable for generation of mid-infrared lasers it is to be understood that the system is not limited to such wavelengths, and can be applied to any gain medium with similar energy level structure and one or more long lived lower level bottlenecks (ie virtual ground states). For example the method could also be used for UV, visible wavelengths, infra-red and even radio wavelengths (ie MASER systems). Several variations will now be described to further illustrate the broad applicability of the dual pumping methodology.

In the embodiment shown in FIG. 2B an ion in the upper state 3 first makes a lasing transition to the $^4I_{9/2}$ state which is intermediate between the upper state 3 and the virtual ground stated 2. Once in the $^4I_{9/2}$ state, the ion rapidly decays back to the virtual ground state 2 through a non-radiative multi-phonon decay process. However, it is to be understood that this is not the only arrangement and an ion in the upper state 2 can decay back to the virtual ground state through a non-radiative processes and at least one lasing transition. Examples of non-radiative processes include phonon decay and energy transfer processes (including multi phonon decay, cross relaxation, up conversion etc). For example in another embodiment, the lasing transition and the non-radiative multi-phonon decay shown in FIGS. 2A and 2B could be reversed. That is the second laser pump 40 could excite an ion to an upper state 2 which rapidly decays via a non-radiative process to the upper lasing state, from which a lasing transition returns the ion to the virtual ground state.

Figure 8A:
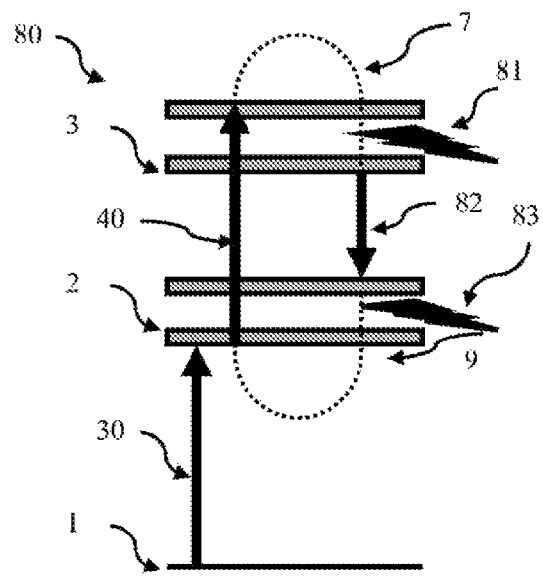
FIG. 8A is a schematic energy level diagram of a laser transition according to an embodiment of the invention.

In another embodiment, the upper state and the upper lasing transition may be coupled by non-radiative processes and the lower lasing state and the virtual ground state may be coupled by non-radiative processes. FIG. 8A is a schematic energy level diagram 80 of a laser transition according to this embodiment of the invention. The second laser pump 40 excites an ion to an upper state which rapidly decays via a non-radiative multi-phonon decay process 81 to the upper lasing state. An ion in the upper lasing state then undergoes a laser transition 82 to a lower lasing state. The ion then returns to the virtual ground state 2 via a non-radiative multi-phonon decay process 83. For example, due to the splitting effects such as (but not limited to) the Stark effect, an energy state may be split into a set of several closely spaced energy sub-levels (eg Stark shifted sub-levels) due to electrostatic effects in the gain medium. The presence and number of split or shifted sub-levels will typically depend upon the specific gain medium and dopant. Thus, in some embodiments the virtual ground state (ie long used excited state) and the lower lasing state are different shifted sub-levels of the same energy state of the gain medium. Similarly, the upper state and upper lasing state could be different shifted sub-levels of the same energy state. In these cases an ion may drop from the upper (or split) sub-level to the lower (or split) sub-level by a non-radiative process (for example these sub-levels could be Stark shifted sub-levels). It is to be understood that in most embodiments splitting or shifting of levels will not affect the underlying pumping methodology.

Figure 8B:
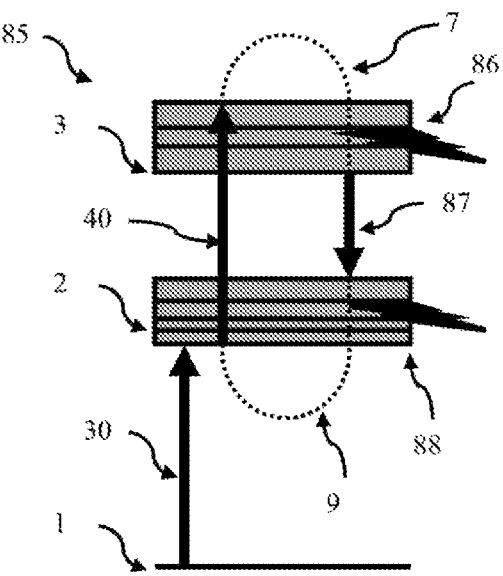
FIG. 8B is a schematic energy level diagram of a laser transition of a laser transition between split energy sub-levels according to an embodiment of the invention.

This is illustrated in FIG. 8B which is a schematic energy level diagram 85 of a laser transition between split energy sub-levels according to an embodiment of the invention. In this embodiment the upper state 3 is a band which is split 86 into 4 sub-levels and the virtual ground state 2 is a band which is also split 88 into 4 sub-levels. The first pump system 30 excites an ion to the lowest sub (shifted or split) level in the energy band of the virtual ground state 2. A second pump system 40 excites an ion from the lowest (split) sub-level of virtual ground state 2 to the upper most (split) sub-level of upper state 3. This then decays down to the lowest (split) sub-level of the band which is the upper lasing state. The ion then undergoes a lasing transition 87 to the upper (split) sub-level of the long lived excited state 2. The ion the decays down to the lowest split sub-level of the band where it can then be recycled back up to the upper level 3.

In another embodiment, the gain medium may include two virtual ground states which an ion in a laser transition can decay back to. In this case another (third) pumping system can be added so that the second pumping system return ions from the first virtual ground state to the upper state and the third pumping system returns ions from the second virtual ground state. A fourth pumping system can be added to replenish the second virtual ground state if required. Additional pumps (or pairs of pumps) can be added if additional virtual grounds states are present.

To summarise, in some embodiments the virtual ground state and the lower lasing state are the same energy state or level and in other embodiments the virtual ground state may be lower than the lower lasing state of the gain medium. In some embodiments, the virtual ground state and the lower lasing level are different sub-levels of the same energy state (or band of levels) of the gain medium. Similarly in some embodiments the upper state and the upper lasing state are the same energy state or level of the gain medium. In some embodiments the upper state is a higher energy state than the upper lasing state (this may be a higher level or higher sub-level).

Figure 7A:
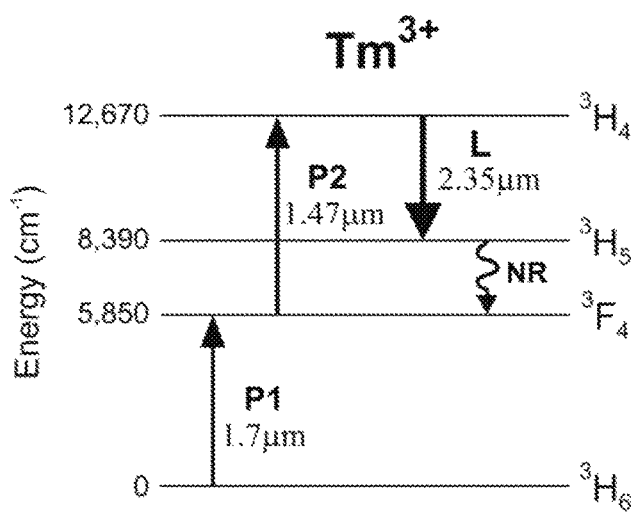
FIG. 7A is as schematic energy level diagram of a Thulium$^{3+}$ illustrates a 2.4 μm lasing transition.
Figure 7B:
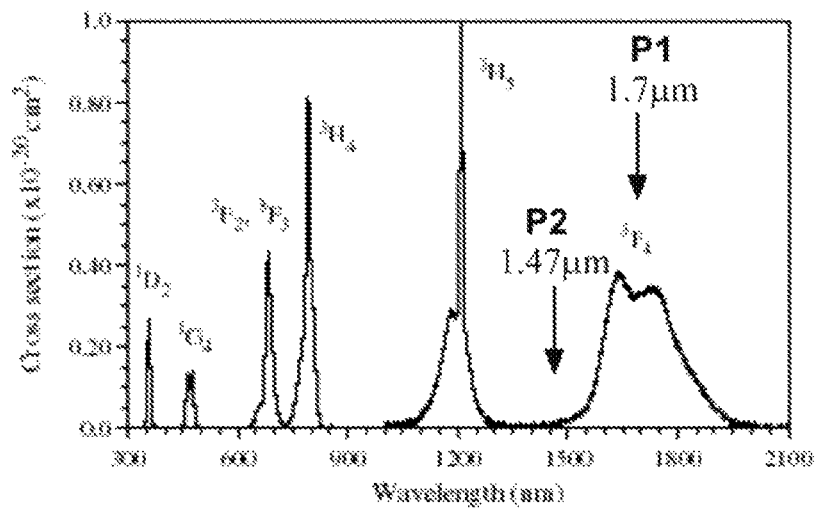
FIG. 7B is a plot of the Thulium$^{3+}$ ground state absorption spectrum.

The gain medium can be selected based upon the desired output laser wavelength and power. Suitable gain mediums include glass fibres (including single clad and double clad optical fibres), a waveguide, a medium containing a dye (ie dye laser), or a bulk host. For generation of lasing in the mid infra-red range (2-16 μm), glass fibres using a low phonon energy glass can be selected to reduce the likelihood of non-radiative transitions from occurring which bridge the lasing transition and significantly reduce the upper lasing state population which leads to increased threshold for laser operation and reduced overall efficiencies. Further, low phonon energy glasses typically have sufficient transparency to allow efficient laser operation in this band. In some embodiments, the gain medium is a rare earth doped glass fibre. The glass fibre may be a low phonon energy glass fibre. Suitable rare earth dopants include (among others) Erbium. Thulium and Holmium in which lasing transitions generate laser EM radiation with wavelengths of 3.5 μm, 2.4 μm and 3.9 μm respectively. As mentioned above, the optimum doping concentration to use will typically depend upon the specific energy level and associated energy loss characteristics of the doped medium. For example, in the Erbium doped system described above a relatively low doping concentration was used, as at high doping concentrations energy exchange processes lead to depopulation of the lasing state, and thus reduced efficiency. FIG. 7A is a schematic energy level diagram of a Thulium$^{3+}$ which illustrates a 2.4 μm lasing transition L and FIG. 7B is a plot of the Thulium$^{3+}$ ground state absorption spectrum. A Thulium based system could be implemented using a first pump P1 with a wavelength of 1.645 μm and a second pump P2 with a wavelength of 1.47 μm. Lasing transitions with other wavelengths can also be generated with these, and other rare, earth dopants, with the wavelength depending upon the exact energy structure of dopant.

Suitable low phonon energy glasses for manufacture of glass fibre lasers include soft glasses such as tellurite, fluoride (including ZBLAN and indium) and chalcogenide glasses which have phonon energies in the range 300-800 cm$^{-1}$. In addition, the considerably lower softening temperatures of these glasses compared with silica allow billet extrusion through stainless steel dies to be used for micro-structured fibre fabrication. The extrusion technique offers the great advantage of being able to create a large range of novel fibre architectures since it allows an almost arbitrary range of structures to be made. In one embodiment zirconium fluoride based glass (ZBLAN) fibre is used as the gain medium. ZBLAN is transparent in the mid-infrared up to 4 μm, can be easily doped with rare earth ions and is a mature technology allowing the use of off-the-shelf fibres. In one embodiment a ZBLAN glass fibre is doped with erbium. The 3.5 μm wavelength $^4F_{9/2} \rightarrow {}^4I_{9/2}$ lasing transition of erbium ions shown in FIG. 2B has a very low emission cross section and this makes the long gain length offered by fibre geometries especially attractive. More generally rare earth dopants with lasing transitions with low emission cross sections can be used with low phonon energy glass fibres to take advantage of the long gain length offered by fibre geometries.

Other glass fibres include Silica glass fibres and Germanate glass fibres. Silica glass fibres have excellent thermal and mechanical stability that enables high power laser generation. However, silica glass fibre has high phonon energy (1100 cm$^{-1}$) and so is typically less preferable for lasers with a wavelength significantly beyond 2 μm. However the method described herein is generally applicable to lasing systems, and is not limited to use only for generating mid infra-red lasers, and thus silica glass fibres could be used in laser systems with a wavelength less than 2 μm (although of course they may still be used beyond 2 μm). Germanate glass sits neatly between the two extremes of silica and the mid-infrared transmitting soft glasses. The combination of reasonable thermal properties (relative to typical soft glasses) and relatively low phonon energy of 800-900 cm−1 (relative to silica glass) make these glasses attractive for high power laser operation in the short mid-infrared (2-3 μm). For example a 2.35 μm Thulium, doped Germanate fibre could thus be manufactured.

In the embodiment described in FIG. 3 EM radiation from the first pump and EM radiation from the second pump are simultaneously directed into the gain medium. In other embodiments the radiation may be directed into the fibre from different ends or at different locations. The pump sources can be continuous sources or pulsed sources. In one embodiment, the pulsed sources are alternatively pulsed or switched into the gain medium. Both the pumps and the laser may be operated in either continuous wave or pulsed modes.

It is also to be understood that whilst the method has been described in relation to glass fibre lasers, other gain mediums such as gases, crystals etc can be used to construct gas lasers, solid state lasers etc. The pump sources generate electromagnetic (FM) radiation. This may include ultraviolet (CV), visible and infra-red. Similarly the laser output (ie laser transition) may be a UV, visible or infra-red. Typically a system designer seeking to generate a desired wavelength can study gain media and/or dopants to identify a material with the desired lasing transition. A dual for multi) pumping system as described herein can then be implemented to generate the desired lasing output. A 260 mW system has been demonstrated, although it will be understood that lower power output systems (eg 1 mW) as well as higher power output systems could be produced (eg 300 mW, 500 mW, 1 W, 10 W etc).

The mid-infrared from 2-16 μm is arguably one of the most poorly exploited areas of the electromagnetic spectrum due to a lack of direct laser sources. There are potentially enormous gains to be made in a number of fields by developing versatile and power-scalable lasers in this spectral region, particularly in medicine, defence, industrial process control and environmental monitoring. Several such applications will now be described.

Gas Sensing:

Fibre lasers open up the opportunity to develop compact, easy-to-handle and low-cost devices for detection of important and dangerous gas species at the point of interest. The direct output near 2.35 μm of thulium doped fibre laser could be used for real-time and remote sensing of highly toxic hydrogen fluoride gas, which is a by-product of aluminium production and semiconductor etching. Another example is real-time monitoring of gases emitted from seismic and volcanic activity, which can provide early warning of these earth activities and thus can have dramatic impact on human life. In addition fibre lasers are a key enabling technology underpinning ongoing development of the differential absorption lidar (DIAL) technique. DIAL is used for remote monitoring of significant greenhouse gases such as methane and for monitoring of water vapour to advance understanding of atmospheric processes.

Surgery:

Another potential strong application area for tunable lasers is in laser surgery. The 2.0-2.7 μm wavelength band is important due to its strong absorption by biological, tissue. Traditionally large water-cooled arc-lamp pumped erbium lasers have been used in this application.

Bio/Chemical Sensing:

The availability of low-cost and compact lasers that can either directly tune to, or be frequency converted into the important 5-16 μm molecular fingerprint region opens up significant opportunities for sensing of biological and chemical species.

Defence:

Standard electronic warfare doctrine demands high power lasers in the 2-5 μm band in order to counter 2-5 μm band sensors used by adversaries. A particular example is directed infrared countermeasure lasers to protect aircraft against the threat of infrared guided missiles.

Dual wavelength pumped laser systems implementing the dual wavelength pumping method described herein can be used for significantly increasing the lasing power available from mid-infrared lasing transitions located significantly above the ground state. The use of a first light pump to excite ions to a virtual ground stated (ie a long lived post lasing state) and a second laser pump to cycle ions from the virtual ground state to an upper state is an efficient mechanism for generating a lasing transition which avoids generation of waste energy. This system thus exploits the long lifetime of the post lasing state, that had previously acted as a bottleneck in other laser systems, and enables the long lifetime to be exploited to turn it into a virtual ground state for the second light pump, and thus allowing continued cycling of ions between the upper lasing state and the virtual ground state (long lived post lasing state). In one embodiment an erbium doped fluoride glass fibre laser has been developed which exhibit an order of magnitude higher power levels and slope efficiency than observed to date (eg 260 mW at 25.4% efficiency compared with previous systems that have generated less than 10 mW at 3% efficiency). The combination of the very short lower lasing level lifetime and the extremely broad nature of this transition enables wavelength tuning range within the 3.2-3.9 μm. Further the dual wavelength pumping methodology described herein can be utilised in a wide range of lasing systems, including low phonon energy glass fibres which will open new opportunities in environmental and medical monitoring applications. Further these laser systems can be operated in pulsed mode or continuous mode, and will enable development of systems with features such as power scaling, mode locking, high peak power generation and wideband tunability which are typically lacking in current laser systems in the mid-infrared. The methodology described herein can thus be used to develop high efficiency and/or high power laser systems in the mid-infrared which will enable a wide range of exciting and long-awaited applications in medicine, defence, industrial process control and environmental monitoring.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A method for pumping a gain medium to generate a lasing transition of a lasing wavelength between an upper lasing state and a lower lasing state in the gain medium, the method comprising:
   directing electromagnetic (EM) radiation of a first wavelength from a first pump source into the gain medium to excite ions in the gain medium from a ground state to a long lived excited state; and
   directing EM radiation of a second wavelength from a second pump source into the gain medium to excite ions in the gain medium from the long lived excited state to an upper state to create a population inversion between the upper lasing state and the lower lasing state to generate the lasing transition;
   wherein the lasing wavelength is longer than the second wavelength; and
   wherein the lasing transition is in the wavelength range of 3.2 µm to 3.9 µm.

2. The method as claimed in claim 1 wherein an ion in the upper state decays back to the long lived excited state through at least one non-radiative process and at least one lasing transition.

3. The method as claimed in claim 1 wherein a lifetime of the long lived excited state is longer than an average time taken for an ion to be pumped by the second pump source to the upper state and to return to the long lived excited state.

4. The method as claimed in claim 1 wherein the EM radiation from the first pump source and the EM radiation from the second pump source are simultaneously directed into the gain medium.

5. The method as claimed in claim 1 wherein the gain medium is one of an optical fibre, a waveguide, a medium containing a dye, or a bulk host.

6. The method as claimed in claim 1 wherein the long lived excited state and the lower lasing state are the same energy state of the gain medium.

7. The method as claimed in claim 1 wherein the long lived excited state and the lower lasing state are different sub-levels of the same energy state of the gain medium.

8. The method as claimed in claim 1 wherein the upper state and the upper lasing state are the same energy state of the gain medium.

9. The method as claimed in claim 1 wherein the upper state is a higher energy state than the upper lasing state of the gain medium.

10. The method as claimed in claim 1, wherein the gain medium is doped with erbium ions or holmium ions.

11. A dual wavelength pumped laser system comprising:
   a gain medium comprising a ground state, a long lived excited state, an upper state, an upper lasing state and a lower lasing state;
   a first pump source configured to generate electromagnetic (EM) radiation of a first wavelength and to direct the EM radiation into the gain medium, wherein the first pump source is used to excite ions in the gain medium from a ground state to a long lived excited state; and
   a second pump source configured to generate EM radiation of a second wavelength and to direct the EM radiation into the gain medium, wherein the second pump source is used to excite ions in the gain medium from the long lived excited state to an upper state to create a population inversion between the upper lasing state and the lower lasing state to generate a lasing transition;
   wherein a lasing wavelength of the lasing transition is longer than the second wavelength; and
   wherein the lasing wavelength is in the range of 3.2 µm to 3.9 µm.

12. The laser system as claimed in claim 11 wherein an ion in the upper state decays back to the long lived excited state through at least one non-radiative process and a least one lasing transition.

13. The laser system as claimed in claim 11 wherein EM radiation from the first pump source and the EM radiation from the second pump source are simultaneously directed into the gain medium.

14. The laser system as claimed in claim 11 wherein the gain medium is one of an optical fibre, a waveguide, a medium containing a dye, or a bulk host.

15. The laser system as claimed in claim 11 wherein the long lived excited state and the lower lasing state are the same energy state of the gain medium.

16. The laser system as claimed in claim 11 wherein the upper state and the upper lasing state are the same energy state of the gain medium.

17. The laser system as claimed in claim 11, wherein the gain medium is doped with erbium ions or holmium ions.

18. The laser system as claimed in claim 11 wherein the gain medium is doped with ions at a low concentration such that the rate of non-radiative processes is slower than the rate of radiative processes.

19. The laser system as claimed in claim 11 wherein the first pump source comprises a first laser and the first wavelength is about 985 nm.

20. The laser system as claimed in claim 11 wherein the second pump source comprises a second laser and the second wavelength is about 1973 nm.

21. The method as claimed in claim 1, wherein the long lived excited state is a lower energy state than the lower lasing state of the gain medium.

* * * * *